3,385,722
PROCESS FOR PRODUCING A THERMOPLASTIC
COMPOSITION SURFACE COVERING
John B. Weaver, Lancaster, Pa., and William H. Powell,
Livingston, N.J., assignors to Congoleum-Nairn Inc.,
Kearny, N.J., a corporation of New York
Continuation-in-part of abandoned application Ser. No.
709,531, Jan. 17, 1958. This application Aug. 23, 1963,
Ser. No. 304,725
18 Claims. (Cl. 117—21)

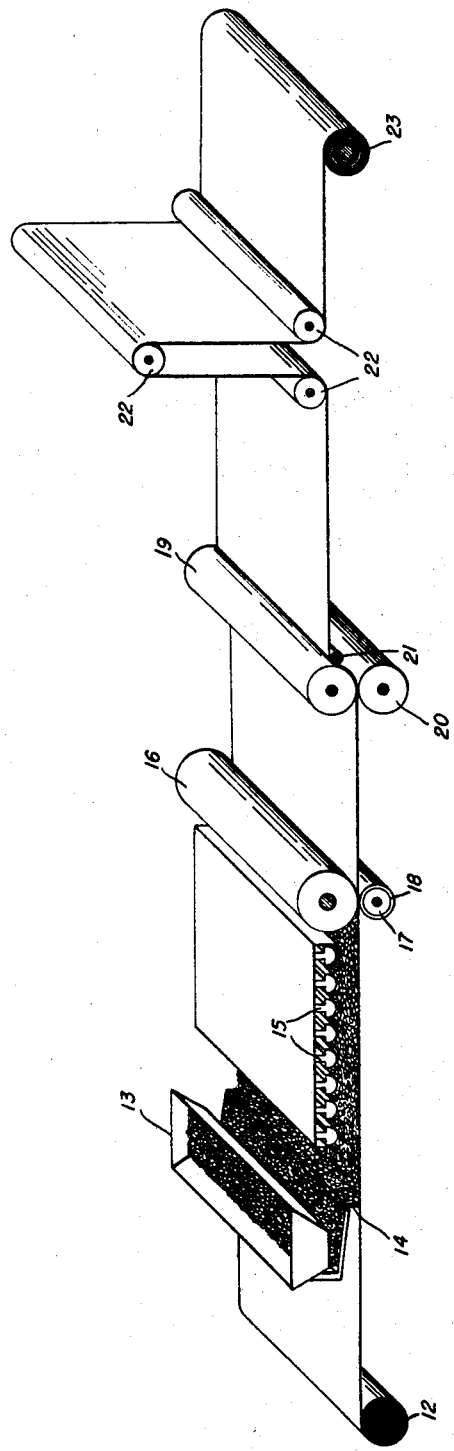

This application is a continuation-in-part of our copending application Ser. No. 709,531, filed Jan. 17, 1958, now abandoned.

This invention relates to flexible, composition surface coverings and particularly to a process for preparing plastic surface coverings having a non-directional, decorative wear layer comprised of a plasticized resinous composition.

In accordance with present commercial practice, plastic surface coverings are composed of plasticized, thermoplastic synthetic or natural resinous binders, pigments, stabilizers, fillers and the like. They are prepared in sheet or tile form and widely used as coverings for floors, walls, vehicle interiors and the like. They usually range in thickness from about 0.020 inch to about 0.125 inch and are often secured to backings such as impregnated felt sheets. Such surface coverings of thermoplastic resin should be distinguished from the linoleum type product which is of a thermo-setting nature. The uncured linoleum type of product closely resembles putty and can readily be molded into shape at low temperature. The thermoplastic synthetic resins, however, must be heated to high temperatures to form them into sheets.

Vinyl resins are most generally employed as the resin in the binder of plastic surface coverings. Polyvinyl chloride, including its copolymers and terpolymers, particularly polyvinyl chloride copolymerized with vinyl acetate, are used in the greatest quantities. Plasticizers are normally added to the resin to make up the binder which gives improved flexibility to the composition. Conventionally, the composition is prepared by mixing all of the ingredients of the composition under conditions of high heat and pressure in a mixing device, such as a Banbury mixer. In this manner, the thermoplastic resin is solvated and fused by the plasticizer and binds the fillers and pigments into a homogeneous composition. After mixing, the composition is sheeted by passing it through calender rolls operating above the softening temperatures of the composition which is usually of the order of 200 to 350° F. A plain colored sheet is obtained in this manner, which, after cooling, is suitable for use as a surface covering.

Most products of the type with which the invention is concerned are intended to have a variegated appearance and, therefore, more decorative and pleasing to the eye. Variegated sheets are obtained by comminuting a number of differently colored plain sheets and mixing the discrete particles so obtained in the desired relative color proportion. The mixture, while in a plastic and moldable consistency, is consolidated by one or more calendering operations at the aforementioned elevated temperatures. In the calendering, the individual particles largely retain their individual colors, but are subject to substantial distortional commingling. This distortional commingling is evidenced in the product of the first calendering by the fact that the particles have become distorted into long streaks to provide a striated effect that is commonly known as "jaspe." In addition to the jaspe effect, a simulated marble effect can be produced by further distortional commingling of the pieces of different color. This is usually accomplished by the so-called cross-calendering technique. By this method, jaspe sheets prepared as described above are cut at intervals, turned 90 degrees, placed in overlapping relationship and fed to a second calender operation. This second calendering breaks up the streaks to form a decoration simulating the graining in marble. This procedure is fully described in United States Patent 2,917,781, which issued on Dec. 22, 1959, to Robert K. Petry.

Variegated color effects likewise have been produced by initially forming by passage between rolls a sheet having substantially uniform color throughout and then prior to further formation of the finished sheet by passage between rolls adding pieces of contrasting color which may be of the character aforesaid, so that, upon being subjected to calendering with the initially formed sheet, they become embedded in the composition sheet. Such products usually depend on the hardness of the decorative pieces and the plasticity of the sheet to become embedded in the sheet with only limited distortion. Such a procedure is described in United States Patent 2,888,975, which issued on June 2, 1959, to Walter E. Benedict.

In recently issued United States Patent 2,908,042, granted on Oct. 13, 1959 to Snyder, a method is disclosed of producing a calendered sheet which has substantially reduced directional characteristics. In accordance with this patent, a bank of granules is fed to a pair of calender rolls utilizing a baffle to limit the flow of granules to the nip of the calender rolls, much as in a manner as disclosed in United States Patent 2,926,100, which issued to Weigle et al. on Feb. 23, 1960. The process differs from the Weigle et al. procedure, however, in that the baffle is oscillated parallel to the nip of the calender rolls to aid in the uniform flow of the granules. This process, although effective to some degree in producing thick sheets, does not prevent substantial distortion in the sheets.

All of these calendering operations, therefore, produce products having directional characteristics. By directional characteristics it is meant that by looking at the product, it is readily apparent to the untrained observer which direction the product was calendered since the decoration is always distorted in the direction of calendering. Heretofore, overall, non-directional decorations with thermoplastic resinous composition have been impossible to obtain by means of continuous calendering equipment particularly in really thin sheets such as below 0.06 inch in thickness. Non-directional decorations have only been obtained by pressing and molding operations whereby particles of resinous composition are spread in a press and forced into a compact, uniform sheet by pressure exerted in one direction on the surface of the particles. In such a system, under suitable conditions and temperature, the particles distort uniformly in all directions. These products are commonly referred to as having a terrazzo type decoration in that they are composed of distinct, non-directional areas of contrasting coloration.

Calendering of thermoplastic resinous composition to form sheets has only been done between hard surface rolls. The hard surface rolls serve as a metering device in controlling the thickness of the sheet produced. The thermoplastic resinous composition is fed to the calender rolls in granule form. It has been the practice to maintain a bank of granules at the nip of the rolls to assure sufficient material to prevent the formation of voids in the calendered sheet. Rubber-back-up rolls in combination with a hard surface roll have been used in processing such sheets for the purpose of glossing or polishing the surface of the sheet. The rubber rolls uniformly press the sheet against the hard surface roll. Such a procedure is shown, for example, in United States Patent 3,074,114, issued to R. K.

Petry on Jan. 22, 1963. Rubber covered rolls are used in order to avoid any gauge reduction of the sheet. If metal rolls are used, the forces on the sheet are such that the gauge of the sheet is always reduced.

It has been suggested in United States Patent 2,318,272, issued to Weigle et al. on May 3, 1943, to calender linoleum composition directly onto a felt backing by feeding the granules and felt to the nip of two rolls. The roll contacting the felt can be a rubber-covered roll. The rubber-covered roll helps to minimize the strains placed on the felt during such a procedure. Linoleum composition is soft and moldable at room temperature. It is necessary, therefore, to maintain a bank of linoleum granules to assure formation of a sheet free of voids. In accordance with this patent, it is necessary to heat the composition and rolls to a temperature at which the impregnant in the felt sheet melts.

An object of the invention is to provide a simple and economical process for producing a flexible, smooth surface covering of plastic composition having an overall, non-directional decoration. Another object of the invention is to provide such a process capable of adaptation to high speed calendering operations. A further object is to provide a process for producing a plastic composition sheet composed of synthetic resinous compositions having unique structural characteristics and an exceptionally smooth and attractive decorative appearance. Other objects of the invention relate to the provision of an improved method for making a plastic composition sheet of synthetic resinous composition having areas of contrasting color whereby sharply defined, predetermined boundaries between the areas of different color are produced. Further objects and the advantages of the invention will be apparent from the following description.

In accordance with the invention, a flexible, smooth surface floor covering having an overall, non-directional decoration is produced by depositing on a backing web a uniform layer of a mixture of two or more different colored granules of plastic composition, heating the granules to approximately the fusion temperature of the composition and subjecting the heated granules to a calendering operation between rolls maintained at temperatures substantially below the fusion temperature of the composition which exert sufficient pressure to uniformly knit the granules together into a sheet without substantially distorting their shape. It is essential to the invention that at least one of the rolls has a resilient surface. The product can then be polished, if desired, to give it a glossier appearance or subjected to other conventional finishing operations such as embossing, cutting or the like.

In accordance with the invention, therefore, it is possible to produce an overall, non-directional decoration in plastic composition sheets by high speed calendering procedures. Such a result was heretofore unobtainable, since the direct calendering of granules of plastic composition together to from a sheet resulted in their elongation and/or streaking with substantially complete loss of the characteristics of individual granules. The reasons for the desirable result of the invention is not known, but it is believed that the backing web helps hold the granules in a mechanical bond thereby preventing their movement.

The invention will be better understood from the following detailed description when read in conjunction with the accompanying drawings wherein typical embodiments are set forth for the purpose of illustration:

The drawing is a perspective view which illustrates one type of apparatus which can be used in the practice of the invention.

Referring to the drawing, a web of backing material 11 is supplied from supply roll 12 and passes under a feeding mechanism indicated at 13 which applies a uniform layer of plastic granules 14 to the surface of the web 11. The feeding mechanism can be any apparatus which is capable of applying a uniform layer of granules to the web. A vibrating feeder, such as those known as the Syntron type, comprising an inclined metal plate and electromagnets which move the surface of the plate rapidly through a small distance has proven particularly effective. The layer of granules is carried by the web to a heating device 15, such as infra-red lamps where the granules are heated to about the fusion temperature of the composition. The granules are preferably heated to as high a temperature as possible but below that temperature at which decomposition of the resin takes place. The exact temperature to which the granules are heated will depend on the particular composition, but as a general rule, a temperature of from 325° F. to 400° F. is operable. The heat is only supplied to the surface of the granules to prevent the web from being heated to above its deterioration temperature. The heated granules are then conveyed by the web between two calender rolls 16 and 17. In the event that the carrier web has a smooth surface, it is desirable to have the granules contact the top roll for a short portion of its revolution prior to passing through the nip. In this manner, the granules are given a preliminary consolidation which helps to prevent them from streaking or being distorted when passed between the calender rolls. The top roll 16 presents a smooth, rigid surface suitable for imparting the desired finish to the composition sheet. Thus, the roll can have a chrome-finish or it can be a polished steel roll. If a surface finish on the sheet of some other type, such as a matte finish or embossed surface, is desired, then the surface of the roll can be appropriate for the production of such a finish. Roll 17 is provided with a surface layer 18 of yieldable, resilient material. For example, the layer 18 on the surface of the roll 17 can be about 1 inch in thickness of some material which will withstand heat. A synthetic rubber material, such as chlorodibutylene polymer or a butadiene and styrene copolymer, is suitable for the purpose. Such rolls typically have a Shore Durometer of 75. The back roll 17 preferably has associated with it a means for circulating a cooling fluid through the roll to maintain its temperature. This is particularly necessary when the web is a felt sheet impregnated with a heat sensitive material. The top roll 16 is maintained at a temperature substantially below the temperature of the granules and will, therefore, present a relatively cold surface to the heated granules. The pressure exerted by the top roll 16 should be just sufficient to consolidate the granules into a smooth uniform sheet with minimum distortion. The pressure applied between the rolls will depend to a great extent upon the components of the composition. The maximum pressure allowable for a particular composition can be readily determined by calendering a small test sample. As a general rule, the pressure should be less than 600 pounds per lineal inch since above this pressure, the resilient covering of the back-up roll will rapidly deteriorate. Pressures of from about 50 pounds per lineal inch to about 300 pounds per lineal inch have been found particularly effective. If desired, only partial consolidation of the granules can take place in this initial pass between the rolls, with complete consolidation taking place in a second unit or a planishing operation. The sheet can be fed from the pressure rolls into a planishing unit if a glossier surface is required on the final product. The planishing unit consists of either two steel rolls 19 and 20 or a steel top roll and resilient-covered back-up roll. The top roll 19, which contacts the surface of the sheet, is heated to as high a temperature as possible without the sheet sticking to the roll. Even higher temperatures can be obtained without distorting the decoration by applying a silicone fluid to the surface of the roll which contacts the plastic composition sheet. The back roll 30 is maintained at a temperature low enough to prevent damage to the felt hereinabove discussed. The pressure exerted on the sheet is sufficient to eliminate any surface irregularities which might be present in the sheet. Usually a pressure of about 200 to 800 pounds per linear inch is sufficient. The resinous sheet is preferably maintained at the temperature at which the granules are fed to the initial calendering step, i.e., at approximately the flow point or fusion temperature. The sheet can be allowed to adhere to and be carried by the top roll for part of its revolution and then stripped from the roll by a stripping roll 21. The sheet on leaving the planishing unit is passed over cooling drums 22 and wound on a collecting roll 23.

As mentioned hereinabove, any plastic composition which is capable of being formed into granules or chips and then molded by the application of heat and pressure can be used in accordance with this invention. The composition usually contains a resin, plasticizer, stabilizer, pigments and filler. Typical formulation comprises about 20% to about 75% resin, about 10 to about 30% plasticizer, about 5 to 75% filler including pigments, about 1 to 3% stabilizers and about 0.5 to 5% lubricant. A particularly useful surface covering can be made by utilizing a composition containing a thermoplastic synthetic resin, such as a polyvinyl resin. Suitable polyvinyl compositions are disclosed, for example, in U.S. Patent 2,558,378, which issued to Robert K. Petry on June 26, 1951. The polyvinyl resins are the most widely used in floor coverings and particularly vinyl chloride polymers. The vinyl chloride polymers can either be simple, unmixed homopolymers of vinyl chloride or copolymers, terpolymers and the like thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ester, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene 2,3-dimethylbutadiene-1,3 piperylene, divinyl ketone and the like. The resins of this type which are of particular usefulness are thermoplastic resins having a softening point above about 150° F. and specific viscosity above about 0.20 as measured in a solution containing 0.40 gram of resin per 100 milliliters of nitrobenzene at 20° C. As is apparent, the higher the viscosity, the more difficulty in converting to a thin sheet. It is preferred to use a low molecular weight resin having a relatively low softening point thereby facilitating the uniting of the granules at the initial calendering. Such resins have a viscosity of about 0.25 to about 0.35.

The synthetic resinous material can be plasticized by any of a number of plasticizers such as esters of straight and branched chain alcohols with aliphatic acids which impart low viscosity and good viscosity stability to a plastisol. Typical plasticizers of this type include dibutyl sebacate, dioctyl sebacate, dioctyl adipate, didecyl adipate, dioctyl acelate, triethylene glycol di(2-ethylhexanoate), diethylene glycol dipelargonate, triethylene glycol dicaprylate and the like. Plasticizers of the aromatic acids or aromatic alcohols and aliphatic acids or aromatic alcohols and aromatic acids are also useful. Typical plasticizers of this type include dibutyl phthalate, dicapryl phthalate, dioctyl phthalate, dibutoxy ethyl ph.halate, dipropylene glycol dibenzoate, butyl benzyl sebacate, dibenzyl sebacate, dibenzyl phthalate and the like. Other types of plasticizers, such as esters of inorganic acids, including tricresyl phosphate, actyl diphenyl phosphate and the like, alkyd derivatives of rosin, chlorinated paraffine, high molecular weight aromatic hydrocarbon condensates and the like can also be used. The plasticizer or blend of plasticizers is chosen to yield a decorative composition of the desired viscosity. In addition, the plasticizer should have a low vapor pressure at the temperatures required to fuse the resin. A vapor pressure of 2 millimeters of mercury or less at 400° F. is satisfactory. The plasticized synthetic resinous binder is mixed with suitable fillers and pigments. Typical fillers are calcium carbonate, clay, silica flour, wood flour and asbestos.

Minor amounts of stabilizers which are incorporated to reduce the effects of degradation by light and heat are also present in the composition. Suitable light stabilizers include resorcinol disalicylate, resorcinol dibenzoate, phenyl phthalate, phenyl benzoate, o-tolyl benzoate, eugeno, guaiacol, o-nitrophenol, o-nitraniline, triethylene glycol salicylate, and organic phosphates and other complexes of such metals as barium, cadmium, strontium, lead, tin and the like.

The composition also preferably includes heat stabilizers such as sulfides and sulfites of aluminum, silver, calcium, cadmium, magnesium, cerium, sodium, strontium and the like, glycerine, leucine, alanine, o- and p-amino benzoic and sulfanilic acids, hexamethylene tetramine, weak acid radicals including oleates, ricinoleates, abietates, salicylates and the like.

The composition should also contain a lubricant or release additive to prevent the composition from sticking to the rolls. The release additive should be fluid at the temperature at which the granules are heated without substantial vaporization. Waxy substances of both synthetic and natural origin can be used as release agents. Such naturally occurring waxes as vegetable waxes, including carnauba wax, cotton seed wax, montan wax, candelilla wax, flax wax, seaweed wax and the like; insect and animal waxes, such as beeswax, Chinese insect wax, spermaceti and the like; and petroleum waxes such as paraffin wax, are effective. Various synthetic waxes can also be used as the release additive in the invention. Waxes prepared by the polymerization of olefins such as ethylene, propylene, butylene and the like in the presence of catalysts such as silica, silica-alumina, molybdena and phosphoric acid are suitable. In addition, various high molecular weight polyethylene and polypropylene glycols are useful waxes.

Fatty acids having from 12 to 30 carbon atoms and their derivatives have been found to be particularly outstanding in that they improve the flow characteristics of the composition under heat and pressure which imparts the required fluidity to the compostion. Such acids as lauric, myristic, palmitic, stearic, behenic and the like, as well as their derivatives such as heavy metal salts, esters, amides and the like, are useful. Salts or soaps of heavy metals such as calcium, magnesium, barium, aluminum, zinc, lead, copper, cobalt and nickel with fatty acids of from 12 to 30 carbon atoms have waxy properties rendering them good release additives for use in the invention. In addition, esters of long chain fatty acids having from 12 to 30 carbon atoms with alcohols having from 6 to 30 carbon atoms are also useful. The esters can be based on such long chain fatty acids as tabulated above and such alcohols as hexyl alcohol, octyl alcohol, isooctyl alcohol, cetyl alcohol, arachyl alcohol, ceryl alcohol and the like. Thus effective esters can include iso-octyl palmitate, cetyl myristate, duodecyl stearate, octyl cerotinate, cetyl palmitate, hexyl carnubate and the like. The higher molecular weight esters have similar physical properties to waxes, and in many cases the major ingredient in a natural occurring wax is a high molecular weight ester as disclosed above.

Resinous compositions of the polyvinyl chloride resin type usually must be heated, depending on their molecular weight, to a temperature between 275° F. and 375° F. to reach the fusion point of the composition. The metal roll contacting the granules usually should be maintained at a temperature at least 50° F. below the fusion temperature of the plastic composition to limit distortion. A temperature differential of from 75° F. to 125° F. is highly desirable. Generally, a temperature of more than 200° F. below the temperature of the granules will result in too much cooling of the granules and, therefore, poor consolidation. The planishing rolls should be maintained at approximately the same temperature as the initial calendering although it is sometimes desirable to maintain the face roll at a slightly higher temperature.

The web on which the plastic composition is pressed can be stripped off the final product or it can be an integral part of the product. If the web is to be stripped off, it is preferred to use a sheet which can be coated with a release agent to prevent the composition from sticking. If the web is to form part of the product, it is preferably coated with an adhesive prior to applying the plastic composition to aid in binding the composition to the web. This is particularly desirable to prevent lateral movement of the granules prior to and during calendering and thereby greatly reduce the possibility of distorting the granules. A particularly suitable adhesive is one that becomes tacky upon heating. Such an adhesive-coated web can be prepared by coating it with an emulsion mixture of Vinsol, a benzene extract of pine wood chips, and synthetic rubber and drying the coating to remove the water. Such a method of forming an adhesive-coated backing material is described in U.S. Patent 2,757,711 which issued on Aug. 7, 1956, to Robert K. Petry et al.

Typical of the backing material which can remain as part of the product are cloth, burlap, felt, paper or similar material. The most conventional backing material is felt having a thickness ranging from about 0.025 to about 0.10 inch with an average of about 0.04 inch. The density of floor covering felt is considerably less than that of paper. The density is generally less than that reflected by a gauge to weight ratio of 0.8 measured according to the formula:

$$\frac{\text{thickness of felt in inches}}{\text{weight of 480 square feet of felt}} \times 1000$$

with the lower values representing the higher densities. The felt has to be saturated with a water-resistant agent which will withstand the high processing temperatures. Particularly suitable agents are synthetic rubber compounds, such as neoprene and synthetic thermoplastic resinous compounds such as polyvinyl acetate.

The thickness of the plastic layer on the web can be varied depending on the ultimate use of the product. If the product is to be used with a backing, a thickness of about 0.010 to 0.075 inch is normally required. If, on the other hand, the backing web is to be stripped from the final product, a somewhat thicker layer is desirable, such as 0.050 to 0.125 inch. The invention finds its greatest utility in producing thin sheets of less than 0.06 inch in thickness.

The granules are homogeneous particles containing all the ingredients of the resinous composition. They are conventionally prepared by mixing the various ingredients of resin, filler, pigments, stabilizer and lubricant in a Banbury mixer at a temperature where the resin becomes solvated by the plasticizer and is soft enough to bind all the ingredients together into a homogeneous mixture. The mixing is usually carried out between 275° F. and 375° F., although the largest majority of commercially available resins require mixing at about 290° F. to 350° F. The homogeneous mass is then sheeted between rolls and the sheet broken up to form the granules. The size of the granules can be varied depending on the type of decoration to be produced. The granules can vary from fine particles having a size from about 0.02 to 0.06 inch in diameter up to granules having a largest dimension of one inch. Even larger granules can be utilized in combination with the smaller granules. It is preferred to use granules within the range of about 0.10 to about 0.50 inch in diameter. The granules can be greater than the thickness of the final sheet, but are preferably less than the thickness of the sheet to be formed. The preferable thickness of the granules is from about 0.01 to about 0.04 inch. Conventionally, the granules are formed from sheets of uniform thickness. Particularly decorative products can be obtained by utilizing a combination of large and small granules.

The following example is given for the purpose of illustration.

EXAMPLE 1

Granules were prepared by mixing the following components at 350° F. in a Banbury mixer, followed by sheeting between calender rolls and breaking up of the calendered sheet.

| | Percent |
|---|---|
| Polyvinyl chloride resin (viscosity 0.27) | 25.4 |
| Plasticizer (dipropylene glycol di-benzoate) | 12.4 |
| Stabilizer (barium-cadmium) (epoxidized resin epox 1004 [1]) | 1.5 |
| Lubricant (stearic acid) | 1.0 |
| Filler (limestone) | 58.7 |
| Pigments | 1.0 |

[1] Shell Chemical Corp.

Granules of about 0.125 inch in diameter and about 0.020 inch in thickness and of three distinct colors were made by the above procedure, varying only the pigment, and uniformly mixed together in equal proportions. The granules were then spread at a depth of about 0.080 inch on a felt backing material having a thickness of about 0.040 inch. The surface of the felt sheet had previously been coated with an adhesive comprising 50% Vinsol and 50% synthetic rubber and impregnated with about 10% polyvinylacetate. The covered sheet was then passed under infra-red heat lamps to raise the temperature of the granules to approximately 350° F. The heated granules were then passed between a polished steel roll having a diameter of 24 inches and a back-up roll having a diameter of 17 inches and a 1-inch thick resilient rubber covering at a speed of approximately fifteen feet per minute. The polished steel roll was maintained at a temperature of about 275° F. and the back-up roll was maintained at approximately 100° F. The rolls exerted pressure of approximately 75 pounds per linear inch on the granules. The calendered material was at a temperature of about 300° F. as it left the rolls and had a thickness of about 0.030 inch, excluding the felt sheet. The surface was heated to approximately 360° F. and then passed through a planisher consisting of a polished steel roll having a diameter of 24 inches and a resilient rubber roll having a diameter of 18 inches. The steel roll was maintained at a temperature of 275° F. and the back-up roll at approximately 120° F. The sheet was striped off of the steel roll after being carried in adherent contact with the roll for a quarter of its revolution. The product was then passed over cooling drums where it was cooled to room temperature and wound on a collecting roll. The product had a decoration which had no directional characteristics and closely simulated stone terrazzo without the mortar surrounding the stones.

Any departure from the foregoing description which conforms to the present invention is intended to be included within the scope of the claims.

We claim:
1. A process for producing a thermoplastic composition surface covering having a non-directional decoration, which comprises uniformly distributing individual homogeneous granules of vinyl composition of contrasting coloration on the surface of a backing web to form a smooth layer of granules, heating the smooth layer of granules to the fusion temperature of the composition and passing the heated granules without substantially altering their position on the backing web between two calender rolls to consolidate the granules into a smooth multicolored sheet without substantially distorting the shape of the granules, the roll contacting said heated granules having a smooth hard surface and the roll contacting said web having a yielding, resilient surface, the surfaces of both rolls being maintained at a temperature substantially below the temperature of said granules.

2. The process for producing a thermoplastic composition surface covering having a non-directional decoration according to claim 1 wherein said vinyl composition is a vinyl chloride composition.

3. A process for producing a thermoplastic composition surface covering having a non-directional decoration, which comprises uniformly distributing individual homogeneous granules of vinyl composition of contrasting coloration having a largest dimension of about 0.10 to about 0.50 inch on the surface of a backing web to form a smooth layer of granules, heating the smooth layer of granules to the fusion temperature of the composition and passing the heated granules without substantially altering their position on the backing web between two calender rolls to consolidate the granules into a smooth multicolored sheet having a thickness of at least 0.02 inch without substantially distorting the shape of the granules, the roll contacting said heated granules having a smooth hard surface and the roll contacting said web having a yielding, resilient surface, the surfaces of both rolls being maintained at a temperature substantially below the temperature of said granules.

4. The process for producing a thermoplastic composition surface covering having a non-directional decoration according to claim 3 wherein said granules have a thickness of about 0.01 to about 0.04 inch.

5. The process for producing a thermoplastic composition surface covering having a non-directional decoration according to claim 4 wherein said granules are heated to a temperature of about 275° F. to about 375° F.

6. The process for producing a thermoplastic composition surface covering having a non-directional decoration according to claim 5 wherein said rolls are maintained at a temperature at least 50° F. below the temperature of the granules.

7. The process for producing a thermoplastic composition surface covering having a non-directional decoration according to claim 5 wherein said rolls exert a pressure of less than 600 pounds per lineal inch on said granules.

8. The process for producing a thermoplastic composition surface covering having a non-directional decoration according to claim 5 wherein said rolls exert a pressure of about 50 to about 300 pounds per lineal inch on said granules.

9. The process for producing a thermoplastic composition surface covering having a non-directional decoration according to claim 5 wherein said vinyl composition contains a vinyl resin having a viscosity above 0.20.

10. The process for producing a thermoplastic composition surface covering having a non-directional decoration according to claim 5 wherein said vinyl composition contains a vinyl resin having a viscosity of about 0.25 to about 0.35.

11. A process for producing a thermoplastic composition surface covering having a non-directional decoration, which comprises uniformly distributing individual homogeneous flat granules of vinyl composition of contrasting coloration on the surface of a backing web to form a smooth layer of granules, each of said granules having a thickness of about 0.01 to about 0.04 inch and a largest dimension of about 0.10 to about 0.50 inch, heating the smooth layer of granules to a temperature of about 275° F. to about 375° F. and passing the heated granules without substantially altering their position on the backing web between two calender rolls to consolidate the granules into a smooth multicolored sheet having a thickness of at least 0.02 inch without substantially distorting the shape of the granules, the roll contacting said heated granules having a smooth hard surface being maintained at a temperature of about 75° F. to about 125° F. below the temperature of the granules and the roll contacting said web having a yielding, resilient surface maintained at a temperature substantially below the temperature of said granules.

12. The process for producing a thermoplastic composition surface covering having a non-directional decoration according to claim 11 wherein said roll having said yielding, resilient surface is maintained at a temperature less than 150° F. and said backing web is an impregnated felted fibrous sheet.

13. The method of consolidating a film on a moving backing, the steps comprising depositing a layer of granular thermoplastic composition on said backing, heating said thermoplastic composition to soften the same, and while maintaining the thermoplastic composition in softened condition consolidating the granules with one another on the surface of said backing to form a solid film while urging the backing into contact with a yielding surface.

14. The method of consolidating a film on a moving backing, the steps comprising depositing a layer of granular thermoplastic composition on said backing, heating said thermoplastic composition to a temperature between 300° F. and 450° F., and while maintaining the thermoplastic composition at said temperature consolidating the granules with one another on the surface of said backing to form a solid film while urging the backing into contact with a resilient surface maintained at a temperature between 180° F. and 300° F.

15. The method of consolidating a film on a moving backing, the steps comprising depositing a layer of granular thermoplastic composition on said backing, heating said thermoplastic composition to soften the same, while maintaining the thermoplastic composition in softened condition consolidating the granules with one another on the surface of said backing to form a solid film while urging the backing into contact with a yielding surface, removing said backing from its contact with said yielding surface, and thereafter repeating the step of urging the backing into contact with a yielding surface.

16. The method of consolidating a film on a moving backing, the steps comprising depositing a layer of a comminuted copolymer of vinyl chloride and vinyl acetate composition on said backing, heating said copolymer composition to a temperature ranging between 300° F. and 450° F., and while maintaining the composition at such temperature consolidating the granules with one another on the surface of said backing to form a solid film while urging the backing into contact with a yielding surface.

17. The method of consolidating a film on a moving backing, the steps comprising depositing a layer of a comminuted thermoplastic composition comprising a copolymer of vinyl chloride and vinyl acetate containing 95% vinyl chloride and 5% vinyl acetate on a backing, heating said composition to a temperature ranging between 300° F. and 450° F., and while maintaining the composition at this temperature consolidating the granules with one another on the surface of said backing to form a solid film while urging the backing into contact with a yielding surface.

18. The method of consolidating a film on a moving backing, the steps comprising applying a coating of adhesive to said backing, depositing a layer of granulated thermoplastic composition to said backing, heating said thermoplastic composition to soften the same, and while maintaining the composition in softened condition passing it through a pressure-applying station to consolidate said granules into a continuous film by applying pressure to the granules while yieldingly supporting the backing to cause said granules to flow into one another.

References Cited

UNITED STATES PATENTS

| | | | |
|---|---|---|---|
| 2,100,712 | 11/1937 | Emmey | 117—37 |
| 2,279,774 | 4/1942 | Bolton | 117—21 |
| 2,318,272 | 5/1943 | Weigle et al. | 156—242 |
| 2,513,434 | 7/1950 | Tinsley | 117—21 X |
| 2,728,703 | 12/1955 | Kiernan et al. | 156—320 |
| 2,759,866 | 8/1956 | Seymour | 156—321 |
| 2,775,994 | 1/1957 | Rowe | 117—21 |
| 2,888,975 | 6/1959 | Benedict | 156—298 |
| 3,232,780 | 2/1966 | Kupits | 117—9 |

EARL M. BERGERT, *Primary Examiner.*

HAROLD ANSHER, *Examiner.*